(12) United States Patent
Talstra et al.

(10) Patent No.: US 8,917,023 B2
(45) Date of Patent: Dec. 23, 2014

(54) ILLUMINATION SYSTEM AND METHOD

(75) Inventors: Johan Cornelis Talstra, Eindhoven (NL); Hendricus Theodorus Gerardus Maria Penning De Vries, Mierlo (NL); George Frederic Yianni, Eindhoven (NL); Lucius Theodorus Vinkenvleugel, Veldhoven (NL); Franciscus Wilhelmus Adrianus Alphonsus Van Leeuwen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 97 days.

(21) Appl. No.: 13/379,066

(22) PCT Filed: Jun. 14, 2010

(86) PCT No.: PCT/IB2010/052631
§ 371 (c)(1),
(2), (4) Date: Dec. 19, 2011

(87) PCT Pub. No.: WO2010/146519
PCT Pub. Date: Dec. 23, 2010

(65) Prior Publication Data
US 2012/0098436 A1 Apr. 26, 2012

(30) Foreign Application Priority Data

Jun. 19, 2009 (EP) ..................................... 09163185

(51) Int. Cl.
*H05B 37/04* (2006.01)
*H04B 10/116* (2013.01)
*H04B 10/114* (2013.01)
*H05B 37/02* (2006.01)

(52) U.S. Cl.
CPC .......... *H04B 10/116* (2013.01); *H04B 10/1149* (2013.01); *H05B 37/0272* (2013.01)
USPC ............ 315/132; 315/149; 315/151; 315/153

(58) Field of Classification Search
USPC .......... 315/129–134, 149, 151–153, 156–158
See application file for complete search history.

(56) References Cited

U.S. PATENT DOCUMENTS

| | | | |
|---|---|---|---|
| 6,548,967 B1 * | 4/2003 | Dowling et al. | 315/318 |
| 6,969,954 B2 * | 11/2005 | Lys | 315/155 |
| 8,442,403 B2 * | 5/2013 | Weaver | 398/117 |
| 2009/0026978 A1 * | 1/2009 | Robinson | 315/294 |

FOREIGN PATENT DOCUMENTS

| | | | |
|---|---|---|---|
| JP | 2008136138 A | 6/2008 |
| JP | 2009043458 A | 2/2009 |

(Continued)

*Primary Examiner* — James H Cho
(74) *Attorney, Agent, or Firm* — Yuliya Mathis

(57) ABSTRACT

This invention relates to an illumination system (100) comprising a plurality of luminaires (101*a-d*). The luminaires are each arranged to transmit in the light emitted an identification code ID. To ensure sufficient detection of the identification codes during selection with a selection device (120), the system further comprises a control unit (130) which is arranged for identification of any luminaire which has a nominal drive value equal to or below a minimum preset value, or equal to or above a maximum preset value. The control unit sets (or instructs a driver to set) the nominal drive value of such identified luminaire to a predetermined value to achieve a corresponding predetermined light output from the luminaire ensuring a sufficient signal for the transmission of the identification code ID.

11 Claims, 3 Drawing Sheets

(56) References Cited

FOREIGN PATENT DOCUMENTS

| WO | 2004110109 | A1 | 12/2004 |
| WO | 2006079199 | A1 | 8/2006 |
| WO | 2006111930 | A2 | 10/2006 |
| WO | 2007121574 | A1 | 11/2007 |
| WO | 2009010909 | A1 | 1/2009 |
| WO | 2009010916 | A2 | 1/2009 |

\* cited by examiner

ILLUMINATION SYSTEM AND METHOD

FIELD OF THE INVENTION

The present inventive concept relates to illuminations systems, and more particularly to an illumination system comprising a plurality of luminaires, which each is arranged to transmit an identification code in the light emitted, and a selection device arranged for selecting at least one of the luminaires based on its/their identification code(s). Further, a corresponding method is presented.

BACKGROUND OF THE INVENTION

Illumination systems comprising a plurality of luminaires, which utilize transmitting data from the individual luminaires in the light emitted are known. WO2006/079199 discloses a lighting device containing light emitting diodes, LEDs, which are driven e.g. by a pulse width modulation signal, PWM, onto which signal a data signal is modulated. Further, a sensing means is utilized to receive the data signal in the light emitted by the LEDs through detecting all (or part) of the illumination provided by the LEDs. The data signal is subsequently extracted from the detected illumination.

This kind of technique has more recently been used in point-and-control methods for luminaires. Typically, a hand-held selection device is arranged to select and control individual luminaires by pointing at one or more luminaire and identifying the luminaire by means of its retrieved identification code. The identification code may be contained in the luminaire and transmitted to the selection device by modulating the light output from the luminaire in an invisible way, e.g. by means of pulse width modulation, PWM. The identification code is thus modulated onto the average light intensity outputted from the luminaire. This enables the selection device to select a luminaire based on the retrieved identification code in its directional field of view.

However, the above described systems—where the data, e.g. in the form of identification codes, is emitted in and detected from the emitted light—have several problems. When receiving identification codes from a plurality of luminaires, the receiver may not be able to resolve the individual signals for several reasons, e.g. due to low light intensities, obstructing objects in the room, distortion of the modulation signal, etc.

SUMMARY OF THE INVENTION

It is an object of the present invention to overcome this problem, and to provide an improved illumination system and method for selecting a luminaire in such an illumination system. According to a first aspect of the invention, this and other objects are achieved by means of an illumination system comprising a plurality of luminaires, each arranged to transmit in the light emitted an identification code ID. The illumination system further comprises a control unit arranged for identifying at least one luminaire having a nominal drive value being equal to or below a minimum preset value, or equal to or above a maximum preset value. The control unit is further arranged for setting the drive value of such identified luminaire to a predetermined value.

The gist of the invention recites in the recognition that the identification codes are implemented in the light emitted as intensity modulations. In case the drive signal is too low or too high (corresponding to deeply dimmed and near maximum light intensities, respectively), the available modulation depth becomes critical for providing a good signal-to-noise ratio in detecting the identification codes. Thus, an illumination system is achieved, in which the luminaires are identified that operate with a nominal drive value which is too low or too high to allow a reliable and preferably seamless (detection of) intensity modulation, and in which the drive value of these identified luminaires is set to a predetermined value. At the predetermined value the available modulation depth is large enough to achieve good signal-to noise ratios for detection of the codes.

In accordance with an embodiment of the illumination system, the system further comprises a selection device arranged for selecting at least one of the luminaires. The selection is based on the identification codes.

In accordance with embodiments of the illumination system, the selection device is arranged to send a first initialization command and optionally a second initialization command. Upon reception of the first initialization command all luminaires, except the at least one identified luminaire, transmit their identification codes. The step of setting the nominal drive value of the identified luminaire(s) is performed upon reception of the second initialization, after which step of setting the at least one identified luminaire transmits its/their identification code(s).

This way, a first set of readings of luminaires which provide reliable signal strengths of the identification code is detected by the selection device. Subsequently, a second initialization command activates a drive value setting to improve the quality of the transmission/detection of the identification codes for the identified luminaires, which cannot be properly modulated at their nominal drive value settings. Typically, the number of identified luminaires is low, e.g. only a few (say m) out of the total number of lamps (say N) are driven at <10% or >90% of the maximum drive value, respectively. Thus, the probability of the user wanting to select one of these is small: ~$m/N \ll 1$. Consequently, most of the time the user will only send one initialization command.

In accordance with an embodiment of the illumination system, the minimum and/or maximum preset values are set prior to the step of selecting.

The predetermined drive value (and thus the intensity level of light emitted) may advantageously be set at the selection device during either commissioning of the luminaires (initial set up) or at a later stage. For a color-lamp, comprising more than one color channel (colored light sources, e.g. red, green and blue LEDs), a single color channel may be selected for applying the predetermined drive value. This will on the one hand cause a minor shift of the color point in the light emitted, but will at the same time limit the total intensity change of the luminaire.

In accordance with an embodiment of the illumination system, the minimum and/or maximum preset values are set during the step of selecting.

Dynamic setting of the minimum or maximum value is advantageous, for instance when having a luminaire which has a very low drive value close to an off-state for the luminaire. This is done by means of allowing the selection device to initially set a low minimum preset value and if no sufficient detection signal is retrievable by the selection device, the selection device increases the minimum preset value of the luminaire until there is a reliable detection of the emitted light. This way a minimum increase of the total light intensity level of the light emitted from the luminaire is achieved, while still obtaining a reliable detection. This will decrease the visibility of the change in illumination in the room during transmission of the identification code. A similar procedure can be performed to obtain a reliable detection for lamps near a maximum.

In accordance with an embodiment of the illumination system, the predetermined drive value is arranged to be a fixed percentage value of the minimum or maximum preset value, respectively. To minimize any perception of change in light intensity from a luminaire during the step of selecting, the predetermined drive value is preferably set to a value which does not substantially deviate from the nominal drive value, thus the drive value of a deeply dimmed luminaire is increased to e.g. 10% of the maximum drive value for the luminaire, and the drive value of a near maximum luminaire is set to e.g. 90% of the maximum drive value for the luminaire, respectively, before transmission of the identification code.

In accordance with an embodiment of the illumination system, the selection unit is arranged to adjust the minimum preset value based on a signal-to-noise ratio for light detected by the selection device. Thus, the drive signal-to-noise ratio level for the light measurement at the selection device is advantageously utilized as a measure for obtaining a minimum change of the total light intensity outputted (and corresponding to a set drive value) of the identified luminaire.

In accordance with an embodiment of the illumination system, after the step of selecting, the drive value of the identified luminaire is arranged to return slowly back to its initial value (i.e. return over a predefined time interval). The time during which the selection device is selecting a luminaire is relatively short, typically around 200 ms. By allowing the drive value (which corresponds to the light intensity emitted from the luminaire) of the identified luminaire to slowly return to its initial value, the risk of the user perceiving the change in light intensity is decreased.

In accordance with an embodiment of the illumination system, the nominal drive value corresponds to an average light intensity output.

Further, in accordance with a second aspect of the present invention, there is provided a method for selecting a luminaire from a plurality of luminaires. The method comprises identifying at least one luminaire having a nominal drive value which is equal to or below a minimum preset value, or equal to or above a maximum preset value, transmitting from each luminaire an identification code in the emitted light, setting the intensity value of such identified luminaire to a predetermined intensity value, detecting the identification codes, and selecting a luminaire based on a detected identification code. The second aspect of the invention may generally have the same features and advantages as the first aspect.

In accordance with an embodiment of the method, the method further comprises providing a first initialization command. As a response to the first initialization command, the step of transmitting is performed for all luminaires, except the at least one identified luminaire. The method further comprises optionally providing a second initialization command. As a response to the second initialization command the step of setting is performed for the at least one identified luminaire, and the step of transmitting is performed for the at least one identified luminaire.

In accordance with an embodiment of the method, the method further comprises, after the step of selecting, the step of: slowly returning the drive value of the identified luminaire back to its initial value (i.e. return over a predefined time interval).

These and other aspects, features, and advantages of the invention will be apparent from and elucidated with reference to the embodiments described hereinafter. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

Embodiments according to the present inventive concept will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout.

Figure 1:
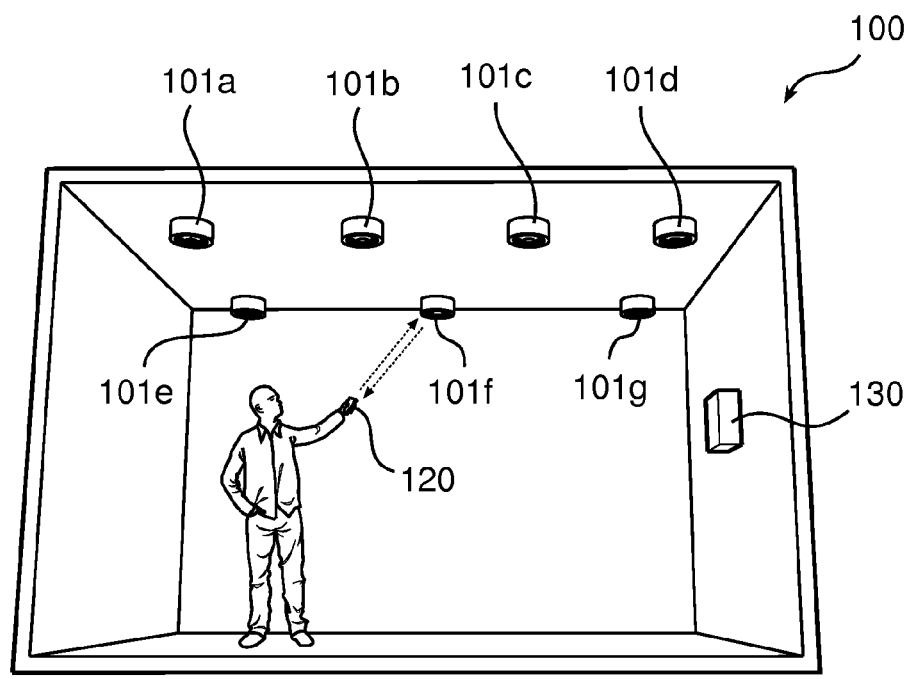
FIG. 1 is an illustration of an embodiment of an illumination system according to the present inventive concept.

FIG. 1 is an illustration of an embodiment of an illumination system 100 according to the present inventive concept. A plurality of luminaires 101a-g are arranged, in f.i. a ceiling for illumination of a room. Each luminaire is arranged to transmit a respective identification code ID in the emitted light. A user is selecting a luminaire by means of a selection device 120, for the purpose of controlling it in an application specific manner. The selection device 120 is capable of selecting a luminaire from a plurality of luminaires by detecting light emitted from the luminaires and identifying the individual luminaires on the basis of their ID codes. Furthermore, each luminaire comprises (or is in communication with) a control unit 130 which is arranged to identify luminaires which have a too high or too low drive value (corresponding to a near maximum and a deeply dimmed average light intensity value, respectively), and to adjust the drive value of these identified luminaires to a predetermined drive value.

Figure 2A:
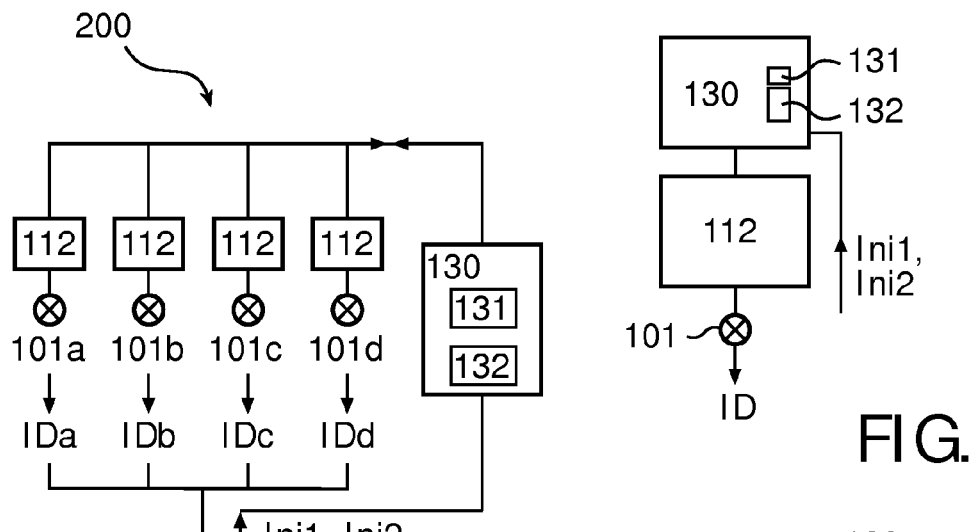
FIGS. 2a to 2c illustrate a schematic block diagram illustrating an embodiment of an illumination system according to the present inventive concept, a luminaire in an embodiment of the illumination system according to the present inventive concept, and an embodiment of a selection device according to the present inventive concept, respectively.
Figure 2B:
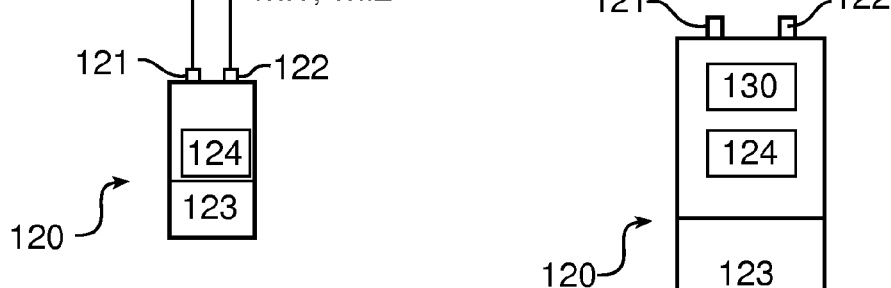
Figure 2C:
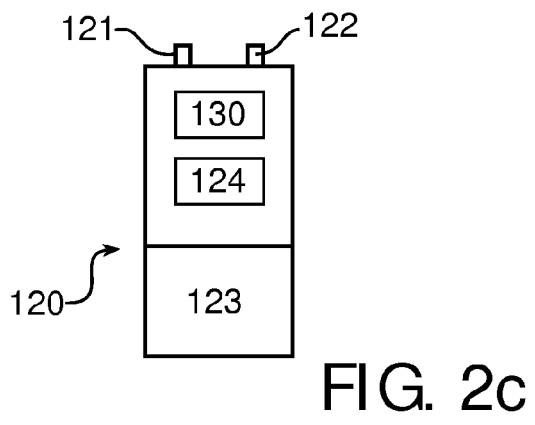

Now referring to FIG. 2a-c, the illumination system according to the inventive concept is explained in more detail. An exemplifying embodiment of an illumination system 200 comprises a plurality of LED-based luminaires 101a-d. The luminaires 101a-d are each arranged to transmit in their emitted light an identification code IDa-d. Here the LED-based luminaires 101a-d employ means for pulse width modulation, (PWM), in a respective electrical driver 112 to set the intensity of the light emitted from the luminaire. Generally, a PWM is controlled with two registers: one which controls the duty cycle of the pulses, which corresponds to the intensity of the light outputted from the luminaire, and the other register sets the PWM frequency. Both registers can generally be set from firmware arranged in a control unit 130. As long as the PWM frequency is above a few hundred Hertz it is substantially invisible to the human eye. By assigning a different PWM frequency to every luminaire 101a-d, a selection device 120 equipped with a light detector 121 and a signal processing unit 124 can distinguish from which luminaire 101a-d light impinging on the detector 121 originates. The light sensor 121 is here a light flux sensor for measuring light intensity. However, other more sophisticated light sensors (like cameras) may also be used to be able to measure other light properties. Also, alternative ways of applying the identification code can be by means of amplitude modulation, code-sequencing, and more. This is well known for a person skilled in the art, and is considered to fall within the scope of the inventive concept.

A respective control unit 130 may be arranged in direct connection with each electrical driver 112 in a luminaire 101, forming a freestanding unit, see FIG. 2b, or be arranged as a central control unit for all luminaires, as is illustrated in FIG. 2a. In an alternative embodiment, the control unit 130 is arranged in the selection device 120, see FIG. 2c. The selection device, is then further arranged to send settings to the respective electrical drivers 112.

In addition to the code-modulation mentioned above, alternatively to applying a respective PWM frequency to each luminaire, a code can also be transmitted in a virtually invisible manner by slightly changing the intensity of the light through changes in the PWM duty cycle. To implement individual IDs, a code division multiple access modulation scheme can be uses and enabled by e.g. on-off keying or bi-phase modulation. Preferably, the IDs are implemented as orthogonal codes allowing them to be easily distinguishable. Because both of these methods can be realized with a firmware-only change they are very cheap to implement in existing illumination systems.

The light sources comprised in the luminaires 101a-d are e.g. based on light emitting diodes, HID lamps (high intensity discharge), halogen lamps, incandescent lamps, and/or fluorescent tubular lamps.

The control unit 130, whether being arranged in each luminaire, in the selection device, or as a central control unit, is arranged in communication (wireless or by wiring) with the luminaires 101a-d for control of the light output from the luminaires 101a-d. In addition, the control unit 130 may have a processing unit 131, and software for controlling the illumination from the luminaires. The control unit 130 may also be connected to a user interface (not shown) to enable explicit programming by a user. Furthermore, the control unit 130 may be arranged to switch each light source totally off by means of a relay or semiconductor switch, thereby enabling the standby power consumption to be reduced (not shown).

Further, the selection device 120 is in this exemplifying embodiment a remote control. In alternative embodiments the selection device may be a stationary device. However, for sake of simplicity the term remote control will be used in the following. The remote control 120 comprises the light detector 121 as discussed above, the signal processing unit 124, i.e. a micro processor, a transmitter 122, for sending signals to the luminaires 101a-d and/or control unit 130, and a user input 123. The user input 123 may be e.g. key-buttons, a touch display, means for voice command, etc. With the user input 123, the user may enter data such as data to be used in the illumination system, data to indicate that a selection should be performed, and selection data.

When a selection of a luminaire is to be performed, the user (or alternatively firmware in the remote control 120 or the control unit 130) initiates the selection. The user typically initiates the selection by pressing a selection button on the user input 123. Subsequently, the communication between the remote control 120 and the control unit 130 is done by means of signals, e.g. rf-signals, light, etc. The remote control sends signals with the transmitter 122 to a corresponding receiver 132, which is arranged in the control unit 130. Alternatively, when the control unit 130 is arranged in the selection device 120 itself, the receivers 132 are arranged at the luminaires 101a-d for the purpose of setting the drive values of the luminaires.

The control unit 130 is arranged for identifying at least one luminaire 101 having a nominal drive value being equal to or below a minimum preset value, or equal to or above a maximum preset value. The nominal drive value for a luminaire may be retrieved from drive settings in the control unit 130, e.g. selected duty cycle, or by measurement of drive current, drive amplitude, present power consumption, settings in the driver 112 etc. Further, the nominal drive value may be retrieved by measuring the present light output intensity of a luminaire, or may be stored in the selection device, or the driver 112 as a result of a previous drive setting action. If a luminaire is identified, which has a nominal drive value complying with the identification requirements, the control unit 130 sets the drive value of such an identified luminaire to a predetermined drive value. For example, if a luminaire is off or has a very low light intensity output, the control unit will set a higher drive value, e.g. 10% of the maximum drive value. Similarly, if a luminaire is set at full or near full intensity, the control unit will set a lower drive value, e.g. 90% of the maximum drive value. The drive value is typically set to a value which ensures a light intensity value of the luminaire that will provide an intensity allowing for transmitting the identification code ID from the luminaire by modulation of the outputted light, but which will preferably be as close as possible to the nominal drive value not to cause too large a change in the illumination in the room.

The respective identification codes IDa-d are transmitted in the emitted light from the luminaires 101a-d. The remote control 120 receives the light from the luminaires 101a-d via the light detector 121 and the detected signal is signal processed. A selection of a particular luminaire may then be performed based on the extracted identification codes IDa-d.

According to an embodiment of the illumination system, the minimum preset value and the maximum preset value may be set before the selecting step, e.g. as inputted by a user, during manufacturing, or during commissioning of the illumination system.

Furthermore, some alternative ways of determining the predetermined drive value may be applied, which will be further discussed herein under.

In an embodiment of the illumination system the predetermined drive value is set to be a fixed percentage value of the minimum preset value (for the too low drive values) and a fixed percentage value of the maximum preset value (for too high drive values). Alternatively, the percentage value is dependent on the minimum preset value or the maximum preset value.

According to an embodiment of the illumination system, the minimum preset value and the maximum preset value are set during the step of selecting. Alternatively, just one of the parameters is set during the step of selecting a luminaire. As an example, the remote control 120 is arranged to adaptively instruct the luminaires to apply a minimum preset value. Initially, the remote control 120 instructs the luminaires 101a-d to apply a low minimum preset value of 1% of the maximum drive value. If the remote control 120 is unable to detect the ID code of a certain luminaire, the remote control instructs the luminaires 101a-d to raise the minimum preset value to 2% and so forth until a sufficient signal containing the ID code from the expected luminaire is detected.

In an embodiment the remote control 120 is arranged to adapt the minimum preset value depending on the prevailing signal-to-noise ratio (SNR). E.g. for deeply dimmed/near-off luminaires, the remote control starts with a low minimum preset value. If the prevailing SNR is too low (because a luminaire is far away, is blocked, or if the nominal drive value for the luminaire is too low), the remote control 120 sends an instruction to the control unit 130 to increase the minimum value of the luminaire until a reliable detection of light having the particular ID code is achieved. A similar procedure can be followed for luminaires with a near maximum intensity.

In an embodiment of the illumination system, the remote control 120 is arranged to send a first initialization command. The user may for instance push a selection button on the user input 123. In addition to the control unit 130 identifying any luminaires with too high or too low drive values, upon reception of the first initialization command all luminaires, except the identified luminaires, transmit their identification codes in their emitted light. The remote control 120 may then select one of the non-identified luminaires. The user may then push the selection button a second time, whereby the remote control is arranged to send a second initialization command. Upon reception of the second initialization command, the control unit 120 is arranged to perform the step of setting the drive values of the identified luminaires to the predetermined drive value. Subsequently, the identified luminaires are arranged to transmit their identification codes. The second initialization command is thus used to allow the user to select a luminaire which is set to a very high or a very low nominal drive value only when he or she indeed wants to do this.

Alternatively, the setting of the drive values of the identified luminaires may be performed by the selection unit 130 instructing the identified luminaires: i.e. the luminaires which are identified as having very low/very high drive powers are arranged to ignore the first initialization command altogether, but increase/decrease, respectively, their drive power upon reception of the second initialization command from the selection unit.

Figure 3A:
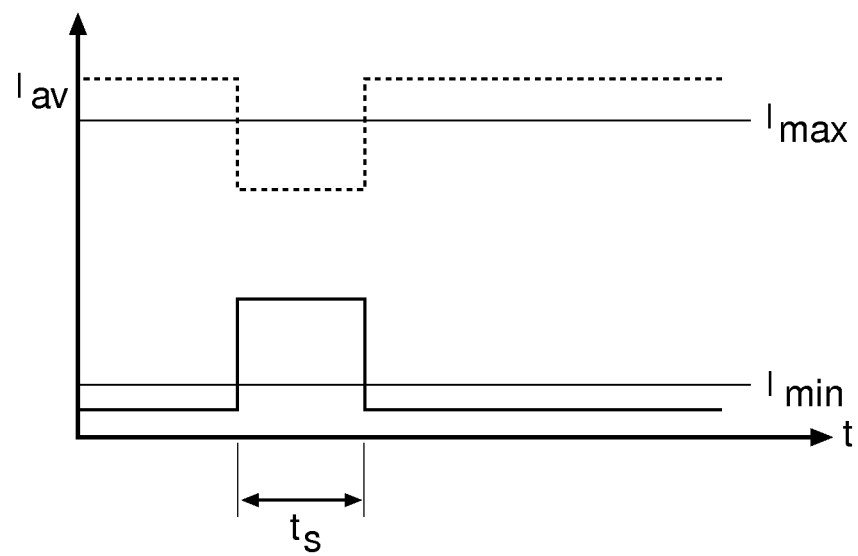
FIGS. 3a to 3c are graphs illustrating the average light intensity with respect to time for identified luminaires according to embodiments of the present inventive concept.
Figure 3B:
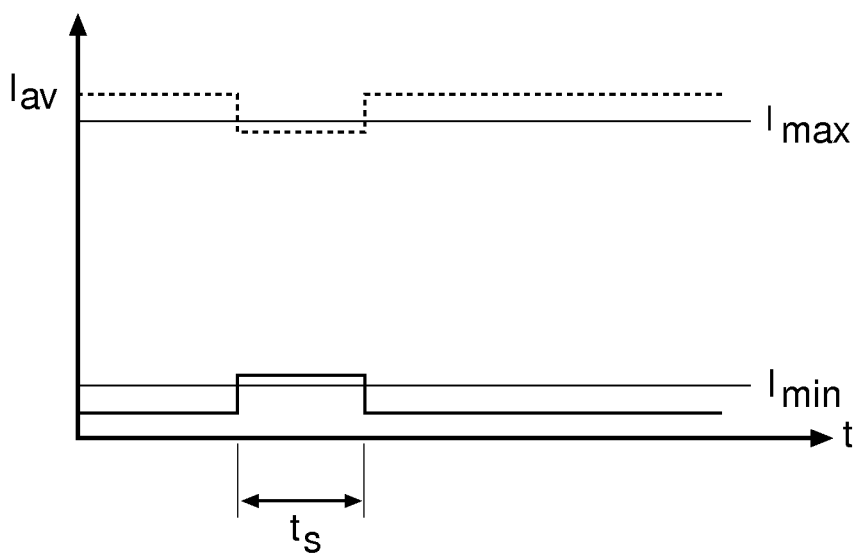
Figure 3C:
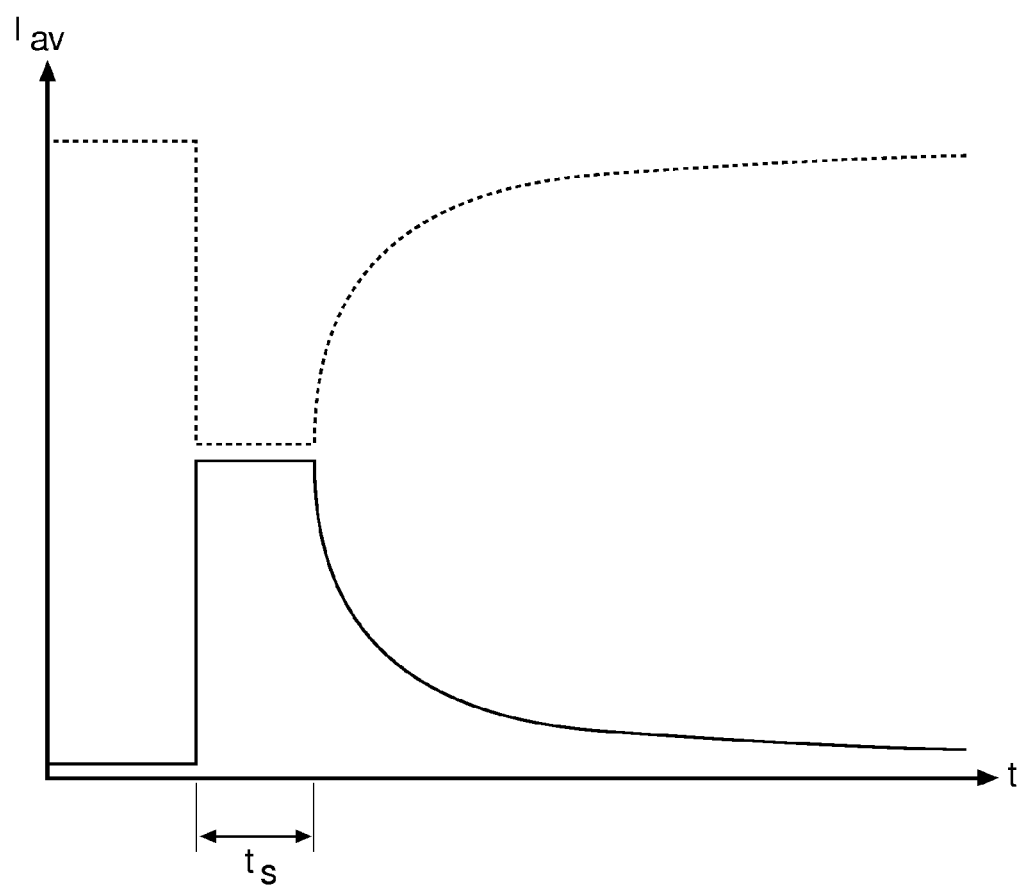

FIGS. 3a to 3c are graphs illustrating the average light intensity outputted from an identified luminaire versus time during the selection. The upper, dashed curve illustrates the average intensity for a luminaire, which initially has a too high drive value as compared to the maximum preset value. The lower solid line illustrates the average intensity for a luminaire, which initially has a too low drive value as compared to the minimum preset value. The maximum and minimum preset values are illustrated in the figures as average intensity values $I_{max}$ and $I_{min}$. In FIG. 3a it is illustrated how the average intensity value of a luminaire having a too high nominal average intensity value is lowered during the selection time $t_s$, and the average intensity value of a luminaire having a too low nominal average intensity value is raised during the selection time $t_s$. The selection time $t_s$, is typically set within a range of 10-500 ms. Preferably, the selection time is set to about 200 ms, which is short enough not to be detectable by the user, and yet long enough for a reliable detection and selection time. Subsequently, the average intensities are returned to the initial nominal values. This may cause a viewer to notice the change in light level, which is undesirable. In FIG. 3b, the difference between the initial nominal average light intensity and the average intensities set during the selection time is much less pronounced. In fact the average intensity values have been set close to $I_{max}$ and $I_{min}$ for minimizing the perceived change of the average light intensity values. The predetermined drive values may also be selected such that the average intensity values during selection are equal to $I_{max}$ and $I_{min}$. FIG. 3c illustrates how the average light intensity values are allowed to smoothly return over a predefined time interval to the nominal average light intensity value (or drive value corresponding to that average light intensity value). The decay time for allowing the light intensity values to return to the nominal average light intensity value is typically set within the range of 1 to 5 s, and is preferably set to 2 s.

A method for selecting a luminaire from a plurality of luminaires according to the present inventive concept comprises:

identifying at least one luminaire having a nominal drive value being equal to or below a minimum preset value, or equal to or above a maximum preset value, setting the drive value of such identified luminaire to a predetermined value, transmitting from each luminaire an identification code in the emitted light, detecting the identification codes, and selecting a luminaire based on a detected identification code.

Furthermore, an embodiment of the method comprises:

providing a first initialization command. As a response to that first initialization command, the step of transmitting is performed for all luminaires, except the at least one identified luminaire. The method further comprises the step of optionally providing a second initialization command. As a response to that second initialization command the step of setting is performed for the at least one identified luminaire, and the step of transmitting is performed for the at least one identified luminaire.

Further, according to an embodiment the method comprises to after the step of selecting slowly returning the drive value of the identified luminaire back to its initial value over a predefined time interval.

Above, embodiments of the illumination system and method according to the present invention as defined in the appended claims have been described. These should be seen as merely non-limiting examples. As understood by a skilled person, many modifications and alternative embodiments are possible within the scope of the invention.

The invention claimed is:

1. An illumination system comprising
   a plurality of luminaires, each arranged to transmit in the emitted light an identification code ID; and
   a control unit arranged for:
      identifying at least one luminaire having an initial drive value being equal to or below a minimum preset value, or equal to or above a maximum preset value; and
      setting the drive value of such identified luminaire to a predetermined value;
   further including a selection device arranged for selecting at least one of said luminaires based on said identification codes;
   wherein said selection device is arranged to send a first initialization command to the control unit, and wherein upon reception of said first initialization command all luminaires, except said at least one identified luminaire, are arranged to transmit their identification codes.

2. An illumination system according to claim 1, wherein said selection device is arranged to send a second initialization command, wherein said control unit is arranged to perform said step of setting the nominal drive value to the predetermined value of said identified luminaire upon reception of said second initialization command, after which step of setting said at least one identified luminaire is arranged to transmit its identification code.

3. An illumination system comprising
   a plurality of luminaires, each arranged to transmit in the emitted light an identification code ID; and a control unit arranged for:
    identifying at least one luminaire having an initial drive value being equal to or below a minimum preset value, or equal to or above a maximum preset value;
    setting the drive value of such identified luminaire to a predetermined value;
    further including a selection device arranged for selecting at least one of said luminaires based on said identification codes
    wherein said minimum preset value and said maximum preset value are set prior to said step of selecting.

4. An illumination system comprising
a plurality of luminaires, each arranged to transmit in the emitted light an identification code ID; and
a control unit arranged for:
    identifying at least one luminaire having an initial drive value being equal to or below a minimum preset value, or equal to or above a maximum preset value;
    setting the drive value of such identified luminaire to a predetermined value;
    further including a selection device arranged for selecting at least one of said luminaires based on said identification codes
    wherein said minimum preset value and said maximum preset value are set during the step of selecting.

5. An illumination system comprising
a plurality of luminaires, each arranged to transmit in the emitted light an identification code ID; and
a control unit arranged for:
    identifying at least one luminaire having an initial drive value being equal to or below a minimum preset value, or equal to or above a maximum preset value; and
setting the drive value of such identified luminaire to a predetermined value;
    wherein said predetermined value is arranged to be a fixed percentage value of said minimum preset value or said maximum preset value, respectively.

6. An illumination system comprising
a plurality of luminaires, each arranged to transmit in the emitted light an identification code ID; and
a control unit arranged for:
    identifying at least one luminaire having an initial drive value being equal to or below a minimum preset value, or equal to or above a maximum preset value; and
setting the drive value of such identified luminaire to a predetermined value;
    wherein said selection unit is arranged to adjust the minimum preset value based on a signal-to-noise ratio for light detected by the selection device.

7. An illumination system comprising
a plurality of luminaires, each arranged to transmit in the emitted light an identification code ID; and
a control unit arranged for:
    identifying at least one luminaire having an initial drive value being equal to or below a minimum preset value, or equal to or above a maximum preset value; and
setting the drive value of such identified luminaire to a predetermined value;
    wherein after the step of selecting, the drive value of said identified luminaire is arranged to return to its initial drive value over a predefined time interval.

8. An illumination system according to claim 7, wherein said initial drive value corresponds to an average light intensity output.

9. A method for selecting a luminaire from a plurality of luminaires comprising:
    identifying at least one luminaire having a nominal drive value being equal to or below a minimum preset value, or equal to or above a maximum preset value,
    setting the nominal drive value of such identified luminaire to a predetermined value,
    transmitting from each of the plurality of luminaires an identification code in the emitted light,
    detecting said identification codes, and
    selecting a luminaire based on a detected identification code;
    providing a first initialization command, wherein as a response to said first initialization command said step of transmitting is performed for all luminaires, except said at least one identified luminaire.

10. A method according to claim 9, further comprising:
    providing a second initialization command, wherein as a response to said second initialization command said step of setting is performed for said at least one identified luminaire, and said step of transmitting is performed for said at least one identified luminaire.

11. A method for selecting a luminaire from a plurality of luminaires comprising:
    identifying at least one luminaire having a nominal drive value being equal to or below a minimum preset value, or equal to or above a maximum preset value,
    setting the nominal drive value of such identified luminaire to a predetermined value,
    transmitting from each of the plurality of luminaires an identification code in the emitted light,
    detecting said identification codes;
selecting a luminaire based on a detected identification code further comprising, after the step of selecting, the step of:
    letting said drive value of said identified luminaire return to its initial value over a predefined time period.

* * * * *